INVENTOR
R. SPILLAR
BY C. S. Hamilton
ATTORNEY

INVENTOR
R. SPILLAR
BY C.B. Hamilton
ATTORNEY

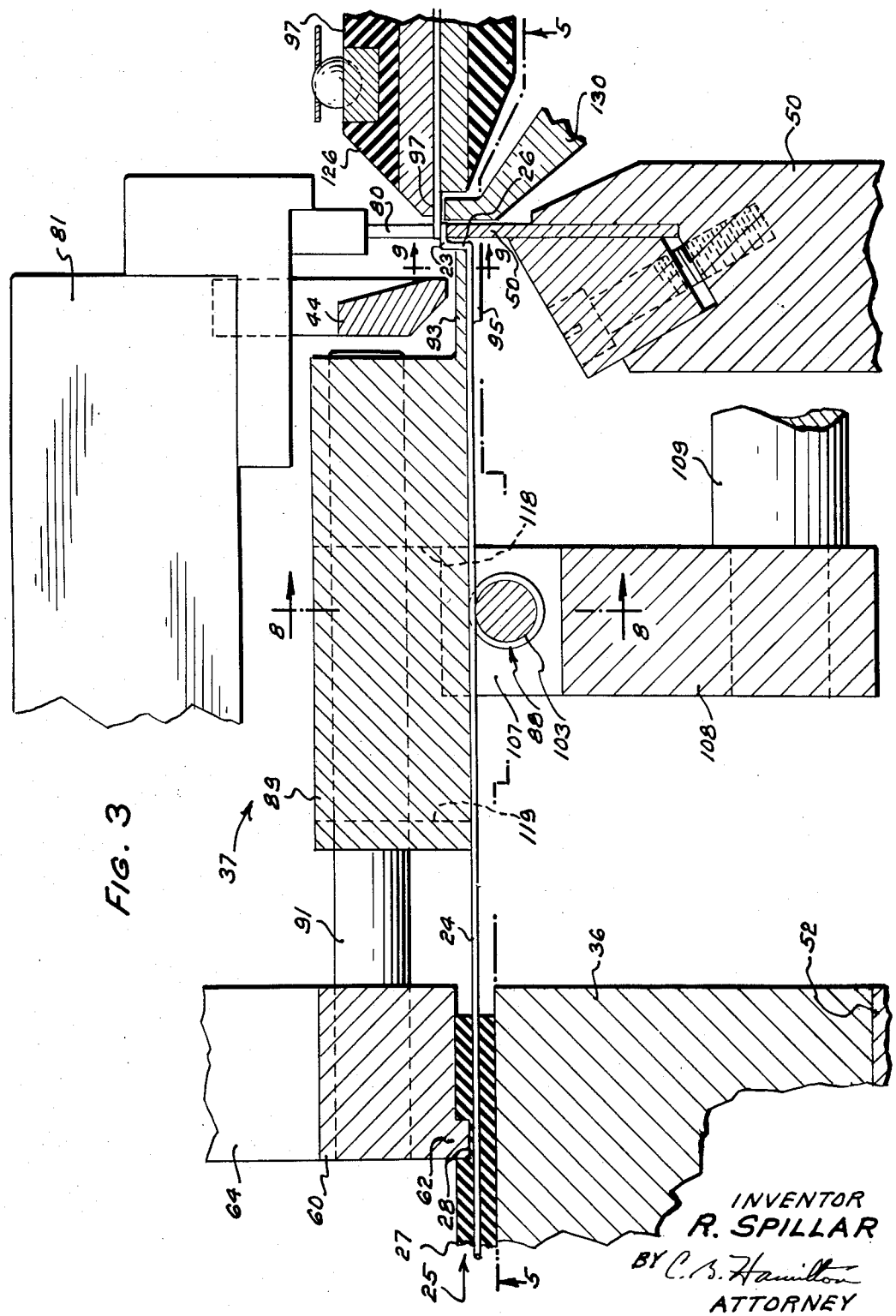

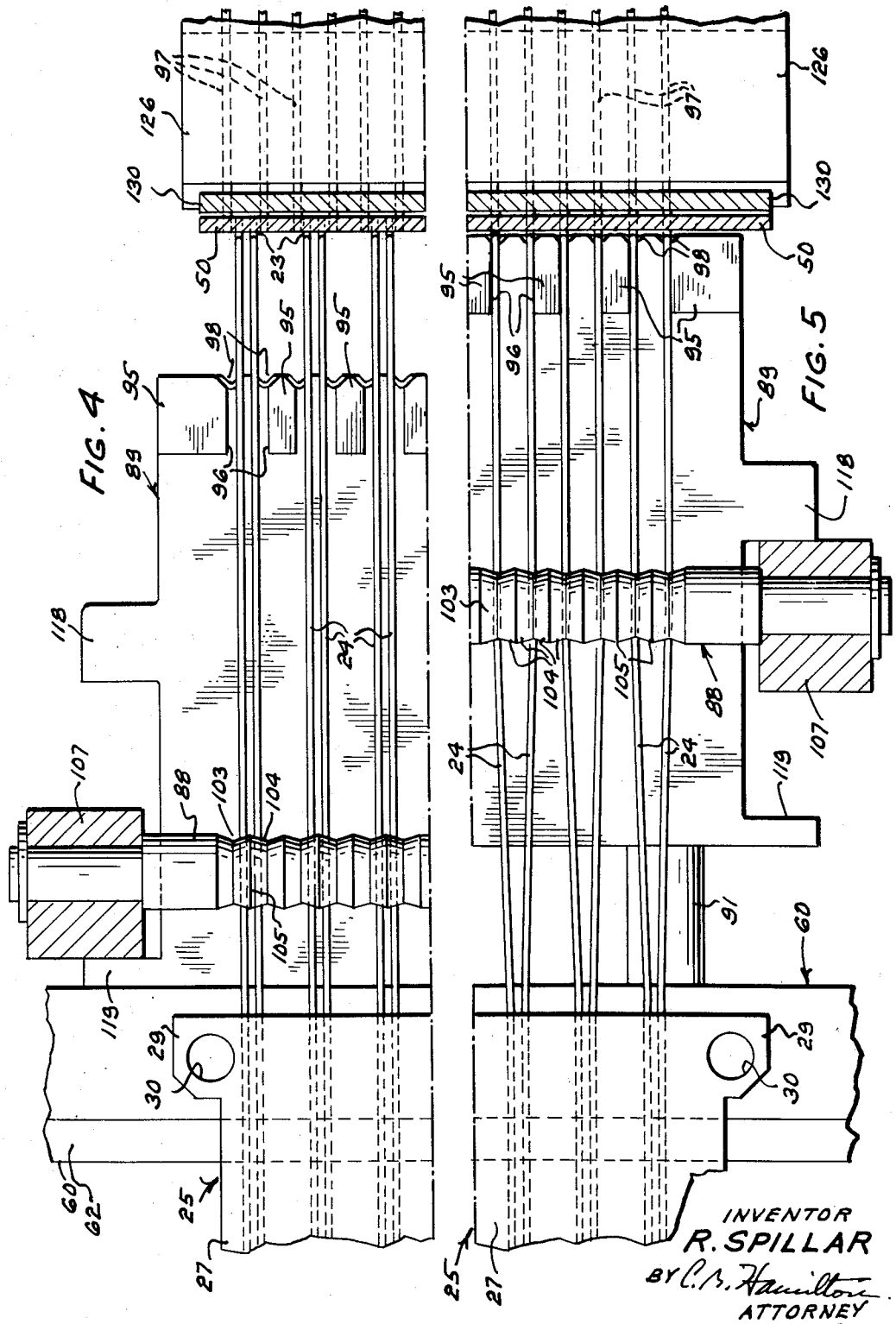

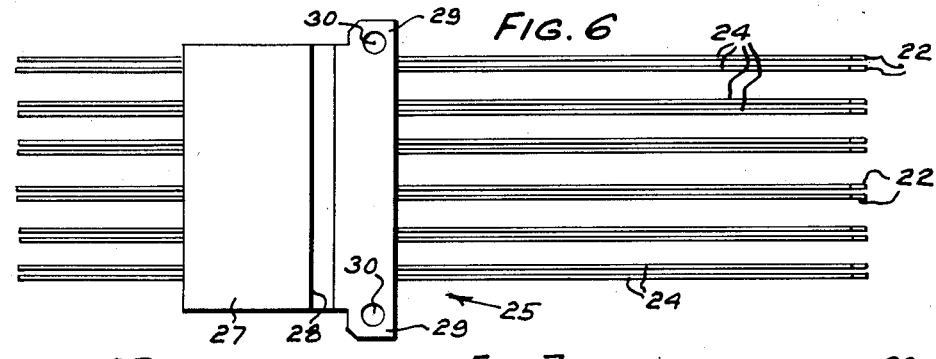
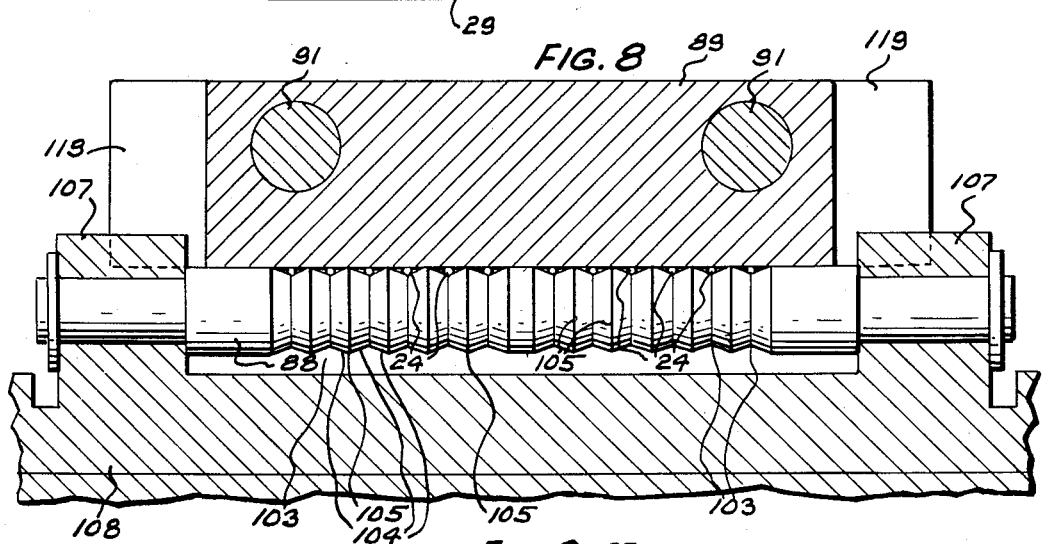
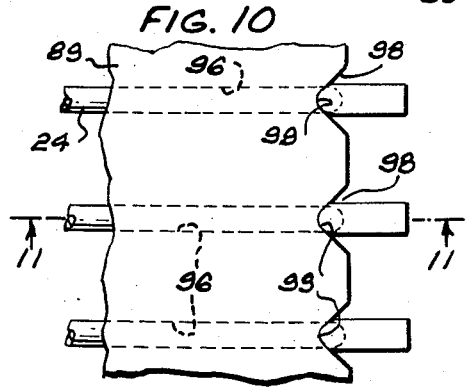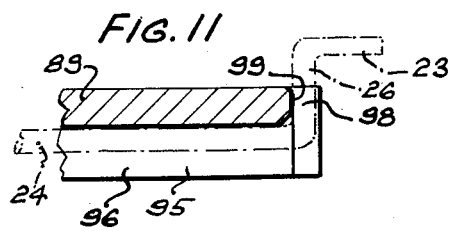

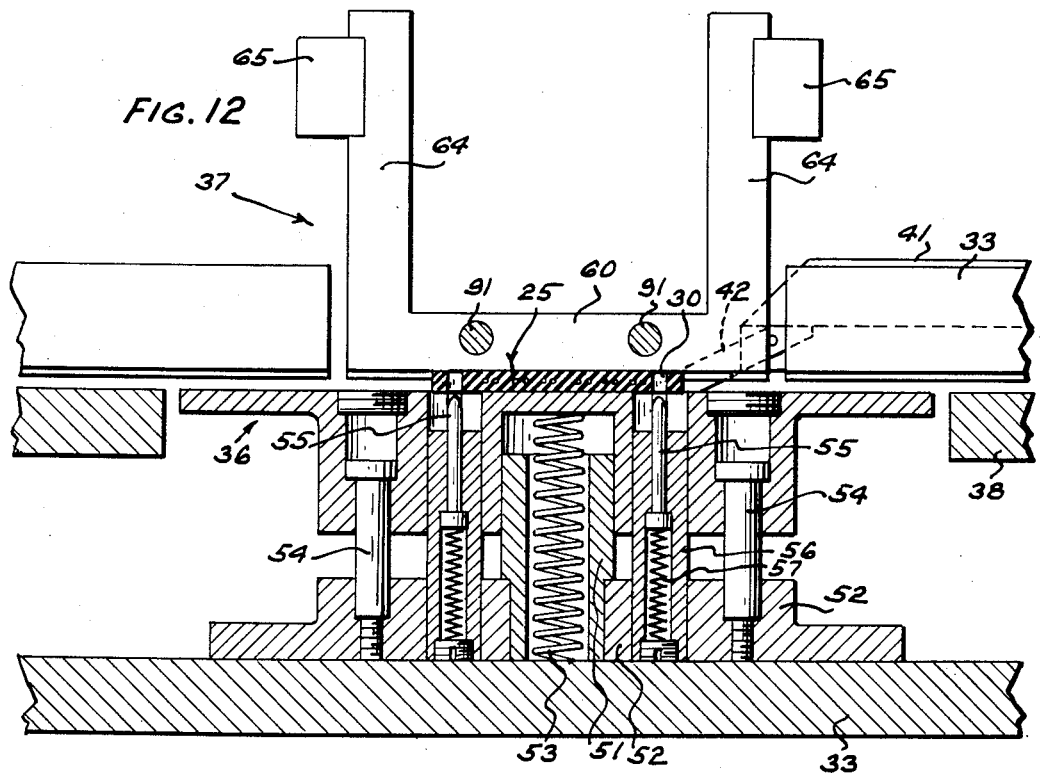
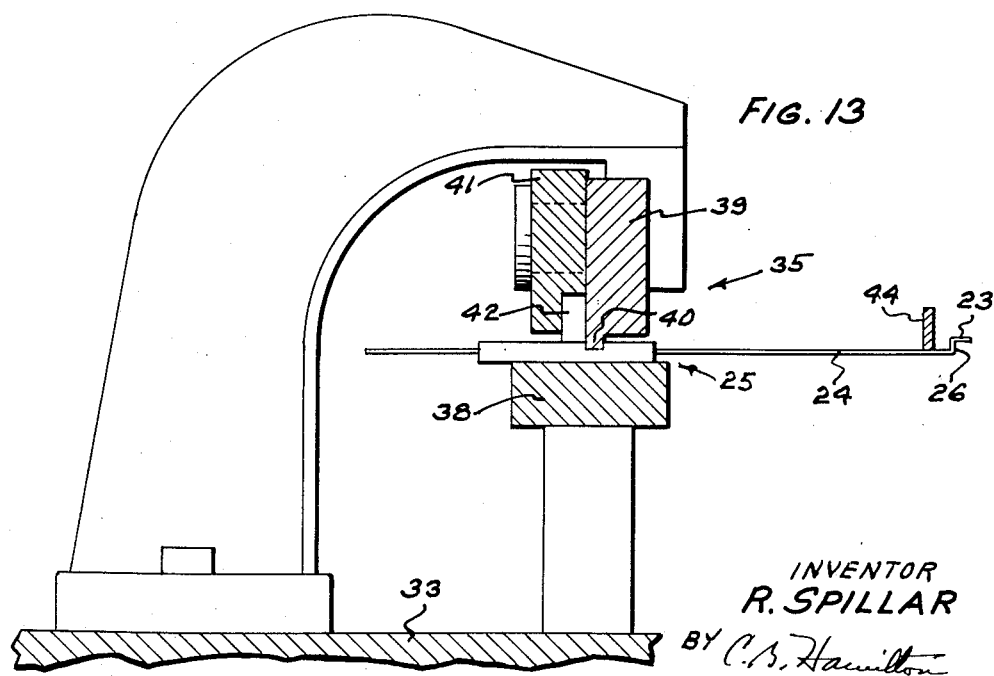

United States Patent Office 2,901,589
Patented Aug. 25, 1959

2,901,589

APPARATUS FOR SPREADING WIRES OF WIRE SPRING RELAY COMPONENTS AND WELDING CONTACTS THERETO

Rudolph Spillar, Cicero, Ill., assignor to Western Electric Company, Incorporated, New York, N.Y., a corporation of New York Application July 17, 1957, Serial No. 672,464

8 Claims. (Cl. 219—78)

This invention relates to welding apparatus and more particularly to apparatus for spreading closely spaced wires of wire spring relay components and welding contacts thereto, and it is an improvement over the apparatus disclosed in Patent Number 2,771,539, issued November 20, 1956, to H. A. Myers on an Apparatus for Welding Contacts Onto Wire Spring Relay Components.

Each of the relay components to which contacts are welded in the apparatus disclosed in the above-referred to patent, comprises a mounting block of dielectric material molded around a predetermined number of parallel wire springs arranged close together in a row and in pairs with the wires of each pair spaced slightly closer to each other than to the adjacent wire of the next pair. Because of the close spacing of the wires to each other in the relay components, contacts are welded onto one set of alternate wires at a first welding station in the apparatus and contacts are welded onto the remaining set of alternate wires at a second welding station of the apparatus.

In another type of relay component only one half of the number of pairs of contacts are required and in this latter type of relay component the pairs of wire springs are spaced apart from one another corresponding to the spacing between alternate pairs of wires of the first mentioned type of wire spring relay component. The welding apparatus disclosed in the above-referred to patent may be used for welding contacts onto the wire springs of this latter type of relay components in two successive welding operations, one at each of the two stations of the apparatus.

An object of the present invention is to provide an apparatus for simultaneously welding contacts onto all of the wire springs of relay components of this latter type.

Another object of the invention is to provide an apparatus for spreading the wire springs of a wire spring relay component within their elastic limits to predetermined positions and for simultaneously welding contacts thereon.

An apparatus illustrating certain features of the invention may include means for holding a relay component at a welding station with the wire springs extending therefrom in parallel relation to each other and with the ends thereof between a bottom elongated electrode and a plurality of upper electrodes, the latter of which are mounted in a predetermined equally spaced relation to one another for movement relative to the lower electrode. Wire positioning and spreading elements disposed on opposite sides of the wire springs at the welding station are actuable to spread the wires of each pair of wire springs laterally and to locate the end portions of the wire springs in predetermined positions in vertical alignment with the upper electrodes. Means are provided for feeding portions of contact tapes onto the ends of the wire springs after which the upper electrodes are actuated to clamp and weld the contact tapes to the wire springs, and thereafter the tapes are severed adjacent the wire springs to form contacts thereon.

Other objects and advantages of the invention will become apparent by reference to the following detailed description and the accompanying drawings illustrating a preferred embodiment of the invention, in which—

Fig. 3 is an enlarged fragmentary vertical sectional view of the apparatus showing the electrodes in closed position and the wire positioning and spreading elements in operative position;

Fig. 4 is a fragmentary sectional view of the underside of the apparatus showing substantially one-half of a relay component with the wire springs before they are spread and showing the wire positioning and spreading elements in normal inoperative position relative thereto;

Fig. 5 is a fragmentary sectional view of the apparatus taken on line 5—5 of Fig. 3 and showing the other half of the wire spring component with the wires spread and the ends thereof located in predetermined positions and showing the wire positioning and spreading elements in their operative position;

Figs. 6 and 7 are plan and side elevational views of wire spring relay components of the type that is to have contacts welded thereto in the present apparatus;

Fig. 8 is a fragmentary vertical cross-sectional view through the wire spreading and positioning elements of the apparatus taken on line 8—8 of Fig. 3;

Fig. 9 is a fragmentary vertical cross-sectional view through a portion of the wire positioning element taken on line 9—9 of Fig. 3;

Fig. 10 is a fragmentary top plan view of the wire positioning element;

Fig. 11 is an enlarged fragmentary vertical cross-sectional view through the wire position element taken on line 11—11 of Fig. 10;

Figure 1:
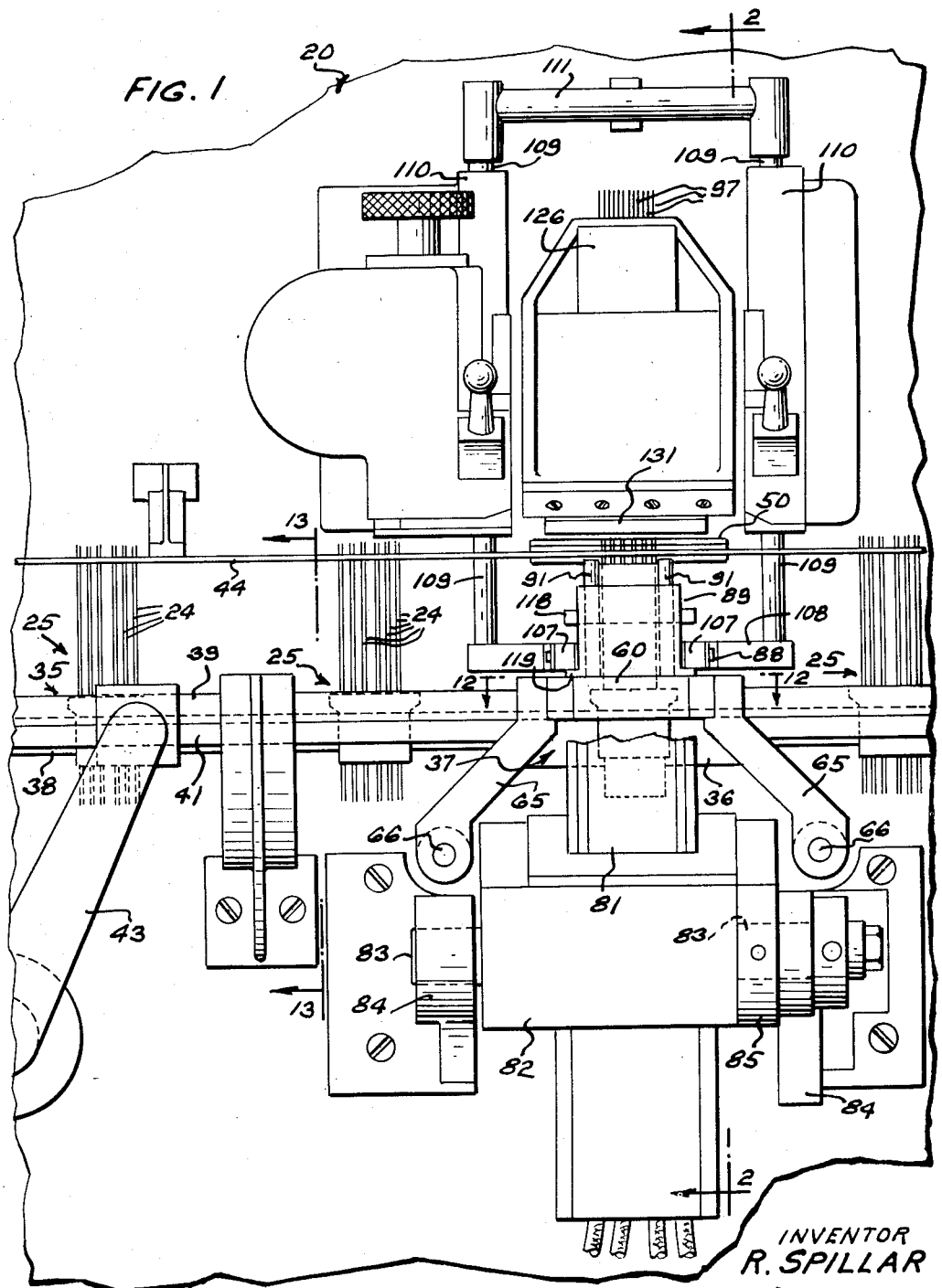
Fig. 1 is a fragmentary plan view of the welding apparatus.
Figure 2:
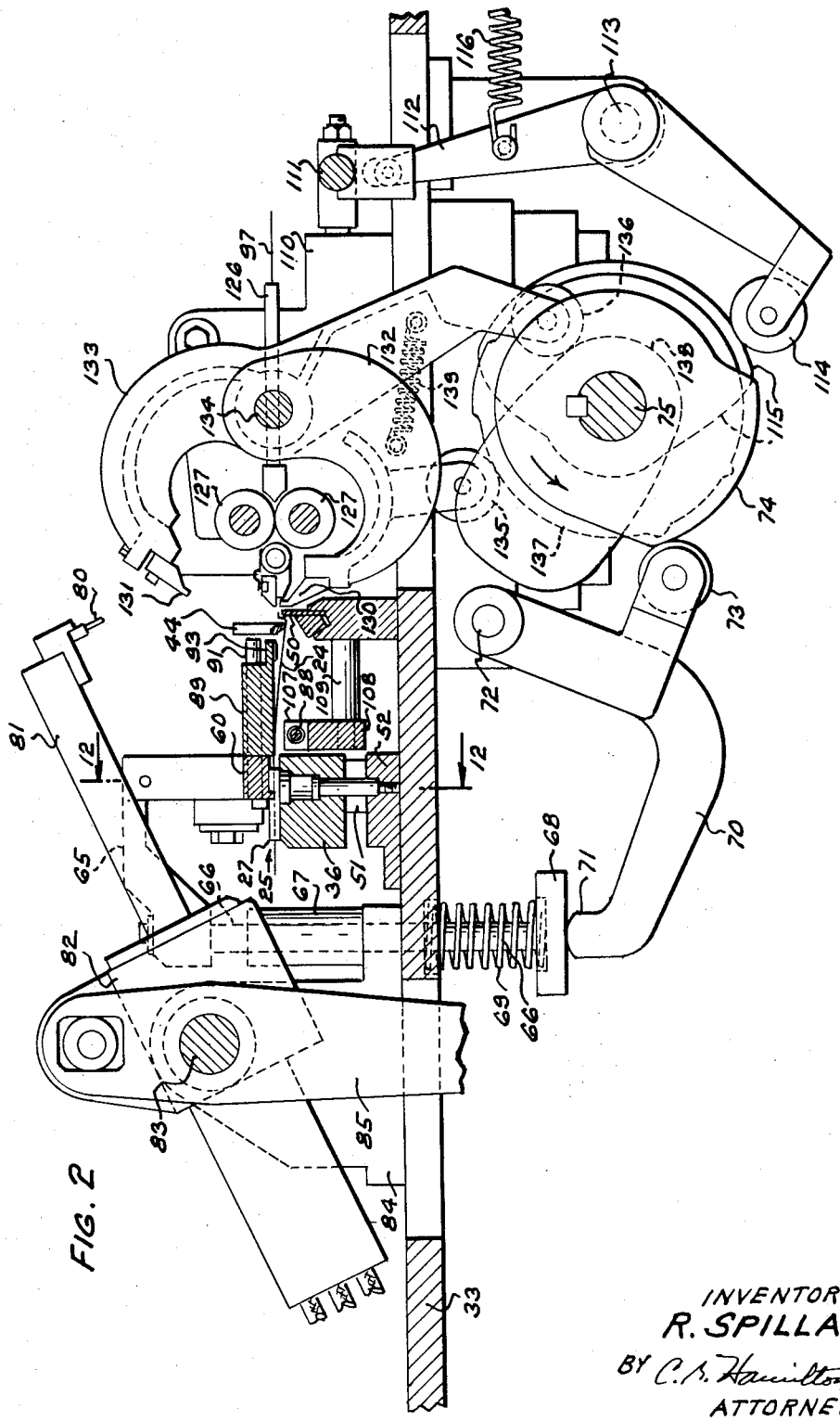
Fig. 2 is a fragmentary vertical longitudinal sectional view of the apparatus taken along line 2—2 of Fig. 1 and showing a relay component at the welding station, the welding electrodes in open position and the wire locating and spreading elements in normal inoperative position.

Fig. 12 is a fragmentary vertical sectional view of the apparatus taken on line 12—12 of Figs. 1 and 2; and Fig. 13 is a fragmentary vertical sectional view of the apparatus taken on line 13—13 of Fig. 1.

The present welding apparatus 20 is designed to weld contacts 22 onto the ends 23 of a plurality of wire springs 24 of a relay component 25 (Figs. 6 and 7). The ends 23 are supported in parallel relation to the wire springs 24 and in offset relation thereto by transverse portions 26 thereof. The wires 24 are molded in a mounting block 27 of dielectric material and are arranged in a row grouped in pairs with the wires of each pair spaced relatively close together and the pairs spaced substantial distances apart as shown in Fig. 6. The mounting block 27 which is positioned intermediate the ends of the wire springs 24 has a transverse groove 28 formed on one side thereof and has a pair of laterally disposed ears 29 provided with apertures 30 therein by means of which the relay components 25 may be aligned and assembled with other components to form relays.

The welding apparatus 20 comprises a horizontal frame plate 33 for supporting the component parts of the apparatus including a transfer mechanism 35 (Fig. 1), for feeding successive relay components 25 onto a holder 36 at a welding station 37. The transfer mechanism 35 includes a lower track 38 (Figs. 12 and 13) for supporting the mounting blocks 27 of the relay components and an upper track 29 having a downwardly projecting rib 40 which fits into the groove 28 of the block 27 for guiding the relay components 25 for movement along a predetermined path. Mounted for reciprocation on the upper track 39 is a feed bar 41 which has feed pawls 42 engageable with the mounting blocks 27 of the relay components and is reciprocated by actuating mechanism including an oscillatable arm 43 (Fig. 1) to advance the relay components 25 step-by-step to and from the welding station 37. A rail 44 is provided to engage the wire springs 24 adjacent the ends thereof during the travel of the relay components to maintain the wire springs 24 under a slight tension and prevent them from becoming crossed or entangled with each other.

The holder 36 (Figs. 2 and 12) is vertically movable from a normal upper position (Fig. 2) for receiving the relay components 25 from the transfer conveyor 35 to a lower position (Fig. 3) for supporting the relay components 25 with the end portions 23 of the wires resting on the narrow upper surface of a lower stationary electrode 50.

As shown more particularly in Fig. 12, the holder 36 is recessed to receive a hollow vertical post 51 for limited vertical movement thereon. The post 51 extends upwardly from a bracket 52 secured to the frame plate 33, and a spring 53 within the hollow post urges the holder upwardly to a normal upper position with the top surface thereof flush with the top surface of the track 38. A pair of headed screws 54 fixed to the bracket 52 and slideable in recesses in the holder 36 limit the upper movement of the holder to its normal upper position, and the upper surface of the bracket 52 limits the downward movement of the holder. A pair of aligning pins 55 are mounted for vertical movement in a pair of hollow guide rods 56 secured to the bracket 52 and slideable in apertures in the holder 50. The aligning pins 55, urged upwardly by springs 57, are adapted to enter the apertures 30 in the mounting block 27 of the relay component 25 to accurately align the relay component on the holder 36 in response to the downward movement of the holder from its normal upper inoperative position to its lower operative position shown in Fig. 3.

Downward movement of the holder 36 and the relay component 25 thereon is imparted thereto by a U-shaped hold down element 60, see Figs. 2, 3 and 12. This hold down element has a horizontal portion which is engageable with the mounting block 27 of the relay component 25 and has a depending rib 62 engageable with the groove 28 in the block 27. Upwardly extending arms 64 of the U-shaped hold down element 60 are secured at their upper ends to a pair of transversely disposed arms 65 which are secured to the upper ends of a pair of rods 66. The rods 66 are guided for vertical movement in guide members 67 mounted on the frame plate 33 and the rods are connected together at their lower ends by a bar 68. Springs 69 interposed between the frame plate 33 and the bar 68 stress the bar 68 and the hold down element 60 connected thereto for movement in a downward direction, and a cam lever 70 with one end 71 thereof in engagement with the bar 68 serves to raise the bar 68 and limit the downward movement thereof. The cam lever 70 is pivotally supported at 72 and has a cam follower 73 riding on a cam 74 secured to a drive shaft 75 whereby the cam 74 and the lever 70 in cooperation with the spring 69 control the vertical movement of the pusher element 60, the holder 36 and the relay component 25 thereon to and from upper and lower positions.

The lower stationary electrode 50 is supported on the frame plate 33 and is sufficiently long to support the ends 23 of the wires 24 of a relay component 25 at the welding station. Cooperating with the lower electrode 50 are a plurality of movable electrodes 80, twelve in number as shown herein, which are uniformly spaced relative to each other except the middle two which are spaced apart a slightly greater distance than the others. The electrodes 80 are individually mounted on the ends of a plurality of levers 81 which in turn are mounted in insulated relation to each other on a carrier 82. This carrier has a pair of trunnions 83 oscillatably supported in a pair of brackets 84 mounted on the frame plate 33, and the carrier 82 is actuated by means including a lever 85 to effect the movement of the electrodes 80 toward and away from the stationary electrode 50 in timed relation to other mechanisms of the welding apparatus.

A wire spring spreading element or roller 88 and a wire spring positioning element 89 are provided for spreading the wires of each pair of wires 24 of a relay component 25 and locating the end portions 23 thereof in predetermined laterally spaced relation to each other corresponding to the spacing of the movable electrodes 80 and in vertical alignment therewith.

A pair of horizontally disposed rods 91 secured to the hold down element 60 support the wire positioning element 89 for horizontal movement thereon and for vertical movement with the hold down element to and from an upper inoperative position (Fig. 2) and a lower operative or welding position (Fig. 3). The guide rail 44 which prevents entanglement among the ends of the wire springs 24, slopes downwardly to a lower level at the welding station 37 to flex the springs 24 downwardly as the relay component 25 is advanced into the welding station to enable the wire springs 24 to clear the wire positioning element 89 as they pass therebeneath (Fig. 2). A portion of the positioning element 89 is reduced at 93 to permit it to pass beneath the rail 44 when the positioning element is moved downwardly and forwardly to the position shown in Fig. 3. The lower surface of the positioning element 89 is flat for engaging the wire springs 24 and it has a plurality of downwardly projecting positioning lugs 95 along the forward marginal portion thereof which form slots therebetween for receiving the wire springs 24 therein. The positioning lugs 95 have vertically disposed positioning surfaces 96 (Fig. 9) against which the end portions of the wire springs 24 are moved to locate them in predetermined accurately spaced relation to each other and in alignment with the movable electrodes 80 and with contact tapes 97 which are to be welded thereto to form the contacts 22. V-shaped notches 98 (Figs. 10 and 11) formed in the forward edge of the positioning element 89 have converging vertically disposed wall surfaces which merge with cylindrical surfaces to form seats 99 for receiving and holding the upwardly directed portions 26 of the wire springs 24 in vertical positions and against lateral displacement to effect the accurate positioning of the end portions 23.

The spreading roller 88 has a plurality of annular V-shaped grooves 103 which form a plurality of conical surfaces 104 sloping in opposite directions from the ridges 105 therebetween. Some of these ridges 105 are disposed in vertical planes which pass midway between the wires of each pair of wire springs 24 of a relay component positioned at the welding station as shown in Fig. 4. The spreading roller 88 is rotatably supported at its ends in a pair of upstanding members 107 on a carrier 108. This carrier is secured to the ends of a pair of rods 109 which are mounted for horizontal reciprocable movement in frame members 110 and are interconnected at their other ends by a cross arm 111. The cross arm 111 is connected to a bell crank lever 112 which is pivotally supported at 113 and has a cam follower 114 engageable with a cam 115 on the drive shaft 75. This cam in cooperation with a spring 116 connected to the bell crank lever 112 serves to reciprocate the carrier 108 and the spreading roller 88 in a horizontal path through a predetermined distance in timed relation to the actuation of the other mechanisms of the apparatus.

When the hold down element 60 and the wire spring positioning element 89 are moved to their lower position, the members 107 of the carrier 108 project above the lower surface of the positioning element 89 and are disposed on opposite sides thereof. In this position the members 107 of the carrier 108 are engageable with laterally extending abutments 118 on the positioning element 89 and serve to move the positioning element from its normally retracted position (Fig. 2) to its forward position (Fig. 3) in response to movement of the carrier 108 to the right as viewed in Fig. 2, and the members 107 are engageable with a pair of laterally projecting abutments 119 on the positioning element 89 for returning the positioning element to its normal retracted position in response to actuation of the carrier 108 to its retracted position.

The spreading roller 88 and the positioning element 89 operate to spread the wires 24 and position the ends thereof in predetermined locations in alignment with the movable electrodes 80 in the following manner. A relay component 25 is fed into the welding station and onto the holder 36 while the spreading roller 88 is in its retracted position and the positioning element 89 is in its upper position as shown in Fig. 2. The spring 66 in cooperation with the cam 74 and the actuating lever 70 then serve to move the hold down element 60 downwardly to push the relay component 25 and the holder 36 downwardly to their lower or welding position during which movement the positioning element 89 moves downwardly with the hold down element 60 and presses the wire springs 24 against the spreading roller 88. The wires 24 of each pair will engage the sloping conical surfaces 104 of the roller on opposite sides of the ridges 105 thereof and will be urged laterally thereby in opposite directions. As the positioning element 89 is yieldably pressing the wire springs 24 against the sloping conical surfaces of the spreading roller 88, the carrier 108 is advanced from its retracted position and the roller 88 rolls against the wire springs 24 and spreads the wires of each pair apart until they seat in the bottom of the grooves 103 of the roller as shown in Fig. 5. During this spreading movement of each pair of wires the end portions of the wires are moved laterally into engagement with the surfaces 96 on the positioning lugs 95. After a predetermined movement of the carrier 108 from its retracted position as shown in Fig. 2 the members 107 thereon engage the abutments 118 of the positioning element 89 and move the positioning element until it is stopped in its advanced position as shown in Fig. 3 by the engagement of the seats 99 thereof with the vertically disposed portions 26 of the wire springs 24. The seats 99, as previously mentioned accurately align the portions 26 of the wire springs 24 in a predetermined spaced and vertical relation to each other whereby the horizontally disposed end portions 23 are accurately positioned in alignment with the movable electrodes 80. It will be noted that the spreading roller 88 engages the wire springs 24 in spaced relation to the block 27 of the relay component and to the ends of the wire springs 24 and that as the wire springs 24 are pressed yieldably against the sloping conical surfaces thereof by the positioning element 89 and as the spreading roller 88 is moved to its advanced position to roll against the wire springs 24, the wire springs 24 are flexed laterally and spread the end portions thereof to their predetermined positions without bending the wire springs beyond their elastic limits. Thus, when the spreading roller 88 is returned to its retracted position and the positioning element 89 is raised to its upper position the wire springs 24 will return to their normal positions in parallel relation with each other.

The contact tapes 97 are guided in suitable guides 126 in predetermined laterally spaced relation to each other corresponding to that of the movable electrodes 80 and in alignment therewith. Suitable feed mechanism including a pair of feed rolls 127 is provided for feeding the contact tapes 124 predetermined distances in timed relation to the actuation of the other mechanisms of the apparatus. After the wire springs 24 have been accurately located in the desired predetermined positions and the contact tapes 79 have been advanced over the ends 23 thereof, the movable electrodes 80 are actuated to press the ends of the tapes against the ends 23 of the wire springs 24 and a welding current is passed through the electrodes, the tapes and the wire springs to weld the ends of the tapes 79 to the ends 23 of the wire springs. The upper electrodes 80 are then elevated to their upper positions and a pair of cooperable cutters 130 and 131 are actuated to sever the contact tapes 79 adjacent the ends 23 of the wire springs 24 to form the welded contacts 22 thereon. The cutters 130 and 131 are carried by levers 132 and 133 which are pivotally supported at 134 and have cam followers 135 and 136, respectively, engageable with the cams 137 and 138 for actuating the cutters in cooperation with a spring 139 connected to the levers.

From the foregoing description it will be seen that the present apparatus is capable of feeding successive relay components to a welding station, spreading the closely arranged wire springs on the relay components and positioning the ends thereof into predetermined spaced relation to each other in alignment with the welding electrodes, feeding portions of contact tapes over the ends of the wire springs, actuating the electrodes and welding simultaneously the contact tapes to the ends of all of the wire springs, and severing the contact tapes adjacent the ends of the wire springs to form contacts thereon.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus having a plurality of laterally spaced electrodes for welding elements onto closely positioned resilient parts of an article, means for supporting the article in a welding position relative to the electrodes, and means for spreading the parts laterally into a predetermined spaced relation to each other in alignment with said electrodes.

2. In an apparatus having a plurality of laterally spaced electrodes for welding elements onto the ends of closely positioned resilient elongated parts of an article, means for supporting the article in a welding position, means engageable with intermediate portions of the parts for spreading the parts, and means engageable with the parts adjacent the ends to limit the spreading movement thereof and to position the ends in a predetermined spaced relation to each other in alignment with said electrodes.

3. In an apparatus for welding contacts onto closely positioned resilient parts of an article, a first electrode means, a second electrode means having a plurality of electrodes in a predetermined laterally spaced relation to each other and cooperable with the first electrode means for welding contacts onto the parts, means for supporting the article with the parts disposed between the first and the second electrode means, and means for spreading the parts laterally into predetermined positions in alignment with the electrodes of said second electrode means.

4. In an apparatus for welding contacts onto a pair of closely positioned wire springs of a wire spring relay component, a first electrode means, a second electrode means having a plurality of electrodes in a predetermined laterally spaced relation to each other and cooperable with the first electrode means for welding contacts onto the wire springs, means for supporting the article with the wire springs disposed between the first and the second electrode means, means for spreading the wire springs laterally, and means for stopping the lateral movement of the wire springs in predetermined positions in alignment with the electrodes of the second electrode means.

5. In an apparatus for welding contacts onto the free ends of a pair of parallel closely spaced wire springs of a relay component, means for supporting the relay component in a welding station, a roller having a pair of V-shaped grooves and a V-shaped ridge therebetween, means at the welding station for supporting the roller transversely of and below the wire springs and for movement in a direction parallel thereto and with the ridge of the roller in a plane disposed between the wire springs, means including a member having a flat surface for pressing the wire springs against the roller, means for moving the roller along an intermediate portion of wire springs toward the free ends thereof to cooperate with the member for spreading the wire springs, means on said member engageable with the free ends of the wire springs as they are being spread to position them in predetermined locations, and means for welding contacts onto the ends of the wire springs in said predetermined locations.

6. In an apparatus for welding contacts onto the ends of a pair of wire springs extending in parallel and close relation to each other from a mounting block of a relay component, a first electrode, a pair of movable electrodes in a predetermined laterally spaced relation to each other and cooperable with the first electrode means for welding contacts onto the wire springs, a roller having a pair of V-shaped grooves and a V-shaped ridge therebetween, means for supporting a relay component with the wire springs thereof between the first and the movable electrodes and for supporting the roller transversely of said wire springs and on one side thereof and with the V-shaped ridge in a plane disposed between the wire springs, means for moving the relay part and pressing the wire springs toward the roller and against the V-shaped ridge thereof to force the wire springs laterally along the V-shaped ridge into the bottoms of the V-shaped grooves to spread the wire springs, means for moving the roller parallel to the wire springs from a position adjacent to the mounting block of the wire spring relay component toward the ends thereof to roll the roller along the wire springs as the wire springs are being pressed thereagainst, and means engageable with the wire springs adjacent to the ends thereof for arresting the spreading movement thereof to predetermined positions in the path of movement of the movable electrodes.

7. In an apparatus for welding contacts onto the ends of a pair of parallel closely spaced wire springs of a relay component, a first electrode means, a second electrode means having a pair of electrodes in a predetermined laterally spaced relation to each other and cooperable with the first electrode means for welding contacts onto the wire springs, means for supporting the relay component in a welding station with the wire springs disposed between the first and the second electrode means, a roller having a pair of V-shaped grooves and a V-shaped ridge therebetween, means at the welding station for supporting the roller transversely of and below the wire springs and for movement in a direction parallel thereto and with the ridge of the roller in a plane disposed between the wire springs, means including a member having a flat surface for pressing the wire springs against the roller, means for moving the roller along an intermediate portion of the wire springs toward the free ends thereof to cooperate with the member for spreading the wire springs, and means on said member for engaging the ends of the wire springs as they are being spread to position them in predetermined locations in alignment with the said electrodes.

8. In an apparatus for welding contacts onto the ends of a pair of wire springs extending in parallel and closely spaced relation to each other from a mounting block of a relay component wherein the ends are disposed in parallel and offset relation to the wire springs by a transversely bent portion, a lower electrode, a plurality of movable upper electrodes in a predetermined laterally spaced relation to each other cooperable with the lower electrode to weld contacts onto the wire springs, a holder engageable with the mounting block for supporting the relay component in a normal upper position with the wire springs disposed in a substantailly horizontal position in a welding station between the upper and the lower electrodes, a roller having a pair of annular V-shaped grooves and an annular V-shaped ridge therebetween, means at the welding station for supporting the roller transversely of and below the wire springs and for movement in a direction parallel thereto and with the ridge of the roller in a plane disposed between the wire springs, hold down means engageable with the mounting block for moving the holder and the relay component thereon to a predetermined lower position with the offset ends of the wire springs on the lower electrode, a member mounted on the hold down means for vertical movement therewith and for horizontal movement relative thereto for pressing the wire springs onto the roller, means for moving the roller horizontally along an intermediate portion of the wire springs toward the ends thereof to cooperate with the member to spread the wire springs, depending positioning elements on said member for engaging the wire springs adjacent the ends thereof as they are being spread to position the ends in predetermined locations in alignment with the upper electrodes, V-shaped notches in the forward edge portion of the member forming seats for receiving the upwardly disposed transverse portions of the wire springs to position them vertically, and means for yieldably moving the member horizontally into engagement with the vertical offset portion of the wire springs to cause them to seat in the V-shaped notches.

References Cited in the file of this patent

UNITED STATES PATENTS 2,771,539   Myers _____ Nov. 20, 1956